(12) United States Patent
Allen

(10) Patent No.: US 12,164,647 B2
(45) Date of Patent: Dec. 10, 2024

(54) MODEL-BASED UPGRADE RECOMMENDATIONS USING SOFTWARE DEPENDENCIES

(71) Applicant: Oracle International Corporation, Redwood Shores, CA (US)

(72) Inventor: Nicholas John Allen, Westlake (AU)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 17/560,133

(22) Filed: Dec. 22, 2021

(65) Prior Publication Data
US 2023/0195901 A1 Jun. 22, 2023

(51) Int. Cl.
G06F 21/57 (2013.01)
G06F 8/41 (2018.01)
G06F 8/65 (2018.01)
G06F 8/71 (2018.01)
G06F 21/70 (2013.01)

(52) U.S. Cl.
CPC ............ G06F 21/577 (2013.01); G06F 8/433 (2013.01); G06F 8/65 (2013.01); G06F 8/71 (2013.01); *G06F 21/70* (2013.01)

(58) Field of Classification Search
CPC ........ G06F 21/577; G06F 21/57; G06F 21/70; G06F 8/433; G06F 8/65; G06F 8/71; H04W 12/37
See application file for complete search history.

(56) References Cited

U.S. PATENT DOCUMENTS

| | | | | |
|---|---|---|---|---|
| 10,691,810 | B1* | 6/2020 | Freitag | G06F 8/71 |
| 2011/0202905 | A1* | 8/2011 | Mahajan | G06F 8/71 |
| | | | | 717/140 |
| 2020/0074084 | A1* | 3/2020 | Dorrans | G06F 21/577 |
| 2022/0083667 | A1* | 3/2022 | Anwar | G06F 8/75 |
| 2023/0134419 | A1* | 5/2023 | Maine | G06F 8/65 |
| | | | | 717/170 |
| 2023/0305827 | A1* | 9/2023 | Dai | G06F 8/658 |

(Continued)

OTHER PUBLICATIONS

Jenson, G. D., et al., "A Formal Framework to Optimise Component Dependency Resolution", 2010 Asia Pacific Software Engineering Conference, Sep. 7, 2021, 8 pages.

(Continued)

*Primary Examiner* — Shaqueal D Wade-Wright
(74) *Attorney, Agent, or Firm* — Lathrop GPM LLP

(57) ABSTRACT

A method may include obtaining, for an application, application dependency specifications, identifying vulnerable components using the application dependency specifications and a list of known vulnerable components, selecting, for a vulnerable component, candidate dependency specifications each specifying a version ID for a component, selecting, for a candidate dependency specification, an upgraded version ID for a component, verifying, using an application dependency graph generated from the application dependency specifications, that upgrading the candidate dependency specification to the upgraded version ID removes a dependency on the vulnerable component, and recommending, for the application, an upgrade solution including upgrading the candidate dependency specification to the upgraded version ID.

20 Claims, 9 Drawing Sheets

(56) References Cited

U.S. PATENT DOCUMENTS

2024/0070289 A1* 2/2024 Wareus ............... G06F 21/568

OTHER PUBLICATIONS

Mancinelli, F., et al., "Managing the Complexity of Large Free and Open Source Package-Based Software Distributions", 21st IEEE International Conference on Automated Software Engineering, Jan. 1, 2006, 10 pages.

Tucker, C., et al., "OPIUM: Optimal Package Install/Uninstall Manager", 29th International Conference of Software Engineering, Jan. 1, 2007, 10 pages.

Kalra, S., et al., "POLLUX: Safely Upgrading Dependent Application Libraries", Nov. 13-18, 2016, 11 pages.

"Versions Maven Plugin", https://github.com/mojohaus/versions-maven-plugin, Jan. 1, 2008, 3 pages.

"MojoHaus Versions Maven Plugin", www.mojohaus.org/versions-maven-plugin, Aug. 10, 2020, 3 pages.

* cited by examiner

Dependency Specification A
402

```
 1  <project ...>
 2  ...
 3    <dependencies>
 4      <dependency>
 5        <groupId>com.fasterxml.jackson.core</groupId>     Component ID
 6        <artifactId>jackson-databind</artifactId>         404
 7        <version>2.9.10</version>
 8      </dependency>                                       406
 9    </dependencies>                                       Version ID
10
11  ...
12  </project>
```

```
1  <project ...>
2  ...
3    <dependencies>
4      <dependency>
5        <groupId>com.fasterxml.jackson.core</groupId>
6        <artifactId>jackson-databind</artifactId>
7      </dependency>
8    </dependencies>              Dependency Specification B
9                                              422
10   <dependencyManagement>
11     <dependencies>
12       <dependency>
13         <groupId>com.fasterxml.jackson</groupId>
14         <artifactId>jackson-bom</artifactId>
15         <version>2.9.10</version>
16         <type>pom</type>
17         <scope>import</scope>
18       </dependency>
19     </dependencies>
20   </dependencyManagement>
21   ...
22 </project>
```

FIG. 4C

```
                                Dependency Specification C
1  <project ...>                            432
2  ...
3    <dependencyManagement>
4      <dependencies>
5        <dependency>
6          <groupId>com.fasterxml.jackson.core</groupId>
7          <artifactId>jackson-databind</artifactId>
8          <version>2.9.10</version>
9        </dependency>
10         ...
11     </dependencies>
12   </dependencyManagement>
13   ...
14 </project>
```

FIG. 4D

```
 1  <project ...>
 2  ...
 3    <dependencies>
 4      <dependency>
 5        <groupId>org.apache.avro</groupId>
 6        <artifactId>avro</artifactId>
 7        <version>1.9.0</version>
 8      </dependency>
 9    </dependencies>
10  ...
11  </project>
```

Dependency Specification D 442

MODEL-BASED UPGRADE RECOMMENDATIONS USING SOFTWARE DEPENDENCIES

BACKGROUND

Software applications often need to upgrade the versions of the components upon which their application depends, particularly when vulnerabilities (e.g., security vulnerabilities) are detected in specific component versions. The software application may be secured by upgrading the vulnerable component to a newer version that fixes the vulnerability. Similarly, when an application becomes outdated due to an outdated component, the application may be updated by upgrading the component to a newer version. However, the newer version of the component may be incompatible with other components, sub-components, sub-sub-components, etc. When an application has transitive dependencies (e.g., layers of components), and components have multiple versions, efficiently identifying component, sub-component, sub-sub-component, etc. versions is challenging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, for an application, application dependency specifications, identifying vulnerable components using the application dependency specifications and a list of known vulnerable components, selecting, for a vulnerable component, candidate dependency specifications each specifying a version ID for a component, selecting, for a candidate dependency specification, an upgraded version ID for a component, verifying, using an application dependency graph generated from the application dependency specifications, that upgrading the candidate dependency specification to the upgraded version ID removes a dependency on the vulnerable component, and recommending, for the application, an upgrade solution including upgrading the candidate dependency specification to the upgraded version ID.

In general, in one aspect, one or more embodiments relate to a system including a repository configured to store application dependency specifications and a list of known vulnerable components. The system further includes a computer processor and an upgrade manager executing on the computer processor and configured to obtain, for an application, the application dependency specifications, identify vulnerable components using the application dependency specifications and the list of known vulnerable components, select, for a vulnerable component, candidate dependency specifications each specifying a version ID for a component, select, for a candidate dependency specification, an upgraded version ID for a component, verify, using an application dependency graph generated from the application dependency specifications, that upgrading the candidate dependency specification to the upgraded version ID removes a dependency on the vulnerable component, and recommend, for the application, an upgrade solution including upgrading the candidate dependency specification to the upgraded version ID.

In general, in one aspect, one or more embodiments relate to a method including obtaining, for an application, application dependency specifications, sending the application dependency specifications to an upgrade manager configured to perform: identifying vulnerable components using the application dependency specifications and a list of known vulnerable components, selecting, for a vulnerable component, candidate dependency specifications each specifying a version ID for a component, selecting, for a candidate dependency specification, an upgraded version ID for a component, verifying, using an application dependency graph generated from the application dependency specifications, that upgrading the candidate dependency specification to the upgraded version ID removes a dependency on the vulnerable component, recommending, for the application, an upgrade solution including upgrading the candidate dependency specification to the upgraded version ID, and transmitting the upgrade solution. The method further includes receiving, from the upgrade manager, the upgrade solution.

Other aspects of the invention will be apparent from the following description and the appended claims.

BRIEF DESCRIPTION OF DRAWINGS

FIG. 4A, FIG. 4B, FIG. 4C, FIG. 4D, FIG. 4E, FIG. 4F, and FIG. 4G show examples in accordance with one or more embodiments of the invention.

DETAILED DESCRIPTION

Figure 1A:
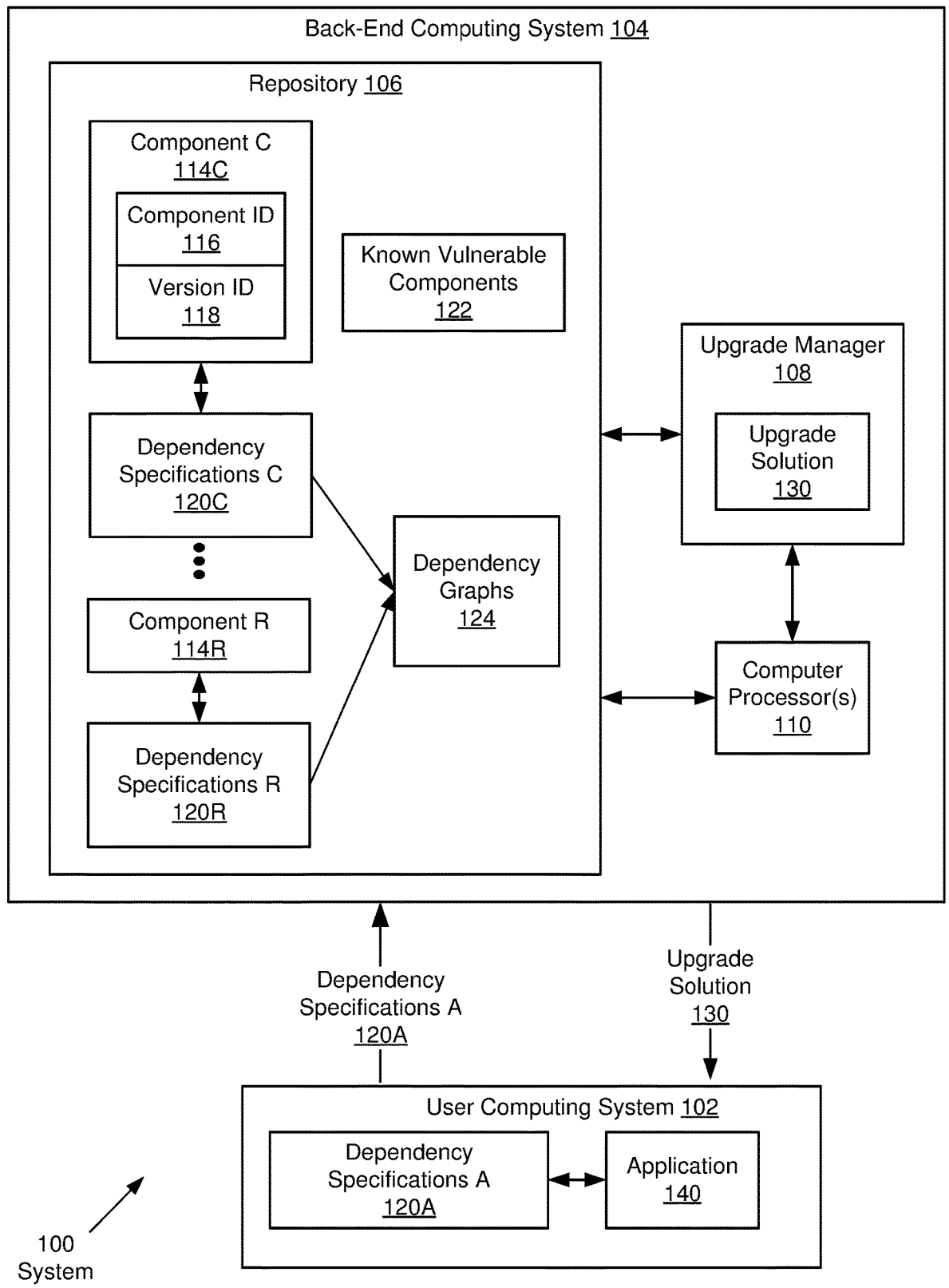
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to upgrading an application. The application's dependency specifications may indicate version IDs of components upon which the application depends (e.g., components that the application calls). Each dependency specification represents a direct dependency of the application on a component.

Similarly, each component's dependency specifications may, in turn, indicate version IDs of other components upon which the component depends. An application dependency graph generated from the application dependency specifications represents both direct dependencies and transitive (i.e., indirect) dependencies of the application on various components.

Vulnerable components upon which the application depends are identified using the application dependency graph and a list of known vulnerable components. Candidate dependency specifications are selected for a vulnerable component. The candidate dependency specifications are upgrade targets and may be processed separately. A candidate dependency specification may directly set the version ID of the vulnerable component. Alternatively, a candidate dependency specification may indirectly set the version ID of the vulnerable component (e.g., the candidate dependency specification may represent a transitive dependency on the vulnerable component).

An upgraded version ID is selected for the candidate dependency specification to remove the dependency of the application on the vulnerable component. The upgraded version ID may represent the minimal upgrade to a subsequent version ID that is closest to the current version ID and removes the dependency on the vulnerable component. Upgrading the candidate dependency specification to the upgraded version ID is verified, using the application dependency graph, to remove the dependency of the application on the vulnerable component. An upgrade solution including upgrading the candidate dependency specification to the upgraded version ID is recommended for the application.

FIG. 1A shows a system (100) in accordance with one or more embodiments of the invention. As shown in FIG. 1A, the system (100) includes a user computing system (102) and a back-end computing system (104). In one or more embodiments, the user computing system (102) and the back-end computing system (104) take the form of the computing system (500) described with respect to FIG. 5A and the accompanying description below or take the form of the client device (526) described with respect to FIG. 5B.

The back-end computing system (104) includes a repository (106), an upgrade manager (108), and computer processor(s) (110). In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Oracle Cloud, Amazon Web Services (AWS), Egnyte, Azure, etc.).

In one or more embodiments, the repository (106) includes functionality to store components (114C, 114R), dependency specifications (120C, 120R), known vulnerable components (122), and dependency graphs (124). The components (114C, 114R) are collections of statements (e.g., computer instructions) written in source code of a human-readable programming language. A component (114C) may be labeled with a component identifier (ID) (116) and a version ID (118). For example, in the dependency specification (402) shown in FIG. 4A, the component "jackson-databind: 2.9.10" has a component ID "jackson-databind" (404) and a version ID "2.9.10" (406).

In one or more embodiments, version IDs are ordered using an ordering scheme based on semantic versioning and/or published timestamps of components (e.g., timestamps obtained from a Maven index of components). For example, when semantic versioning is used, the version ID may be divided into a sequence of three digits indicating a major version ID, a minor version ID, and a patch ID. With semantic versioning, a series of version IDs may be 1.0.0, 1.1.0, 1.1.1, 1.2.0, etc. In one or more embodiments, a second version ID is considered subsequent to a first version ID if the second version ID has a higher version according to the ordering scheme and corresponds to a later published timestamp than the first version ID.

Figure 1B:
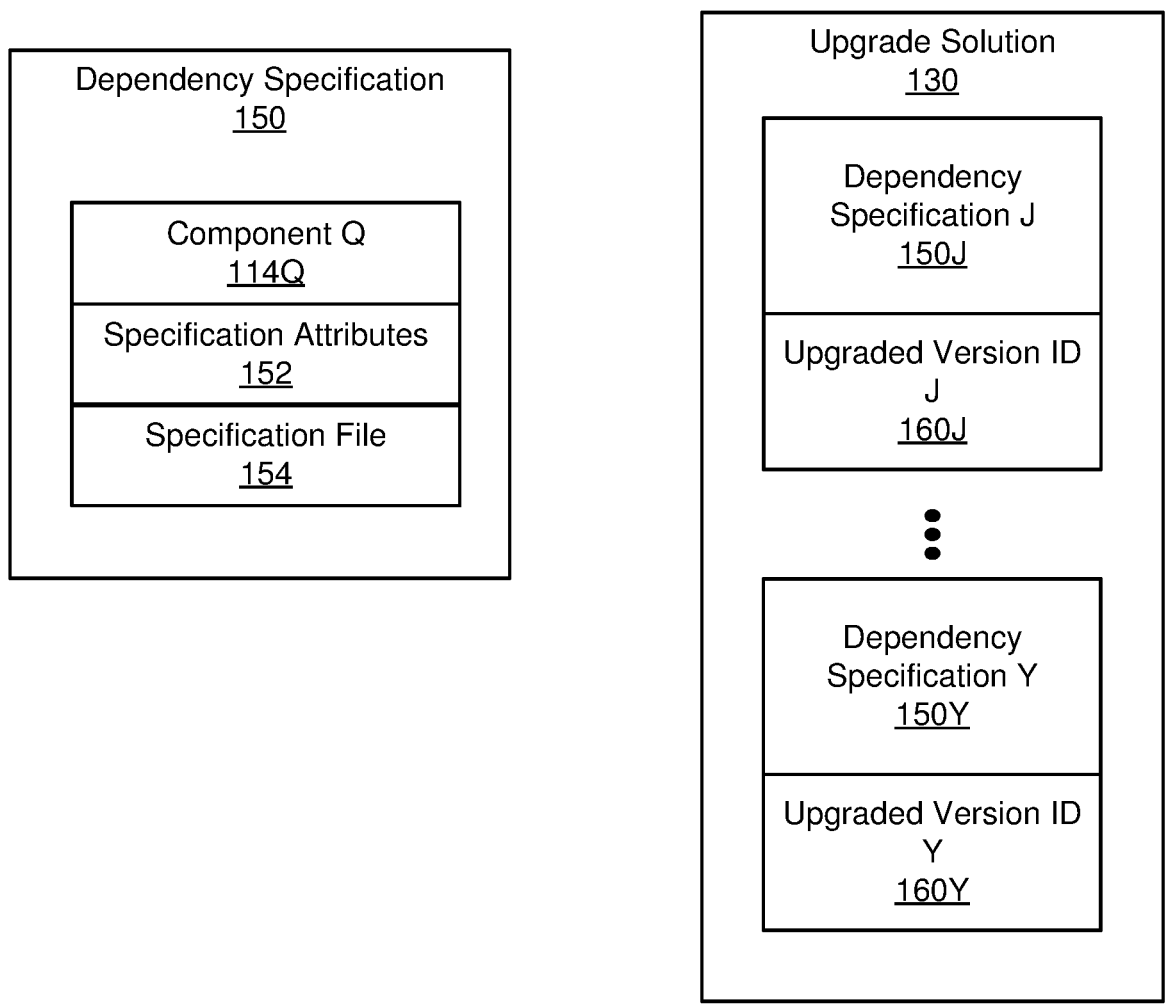
Figures 4A, 4B:
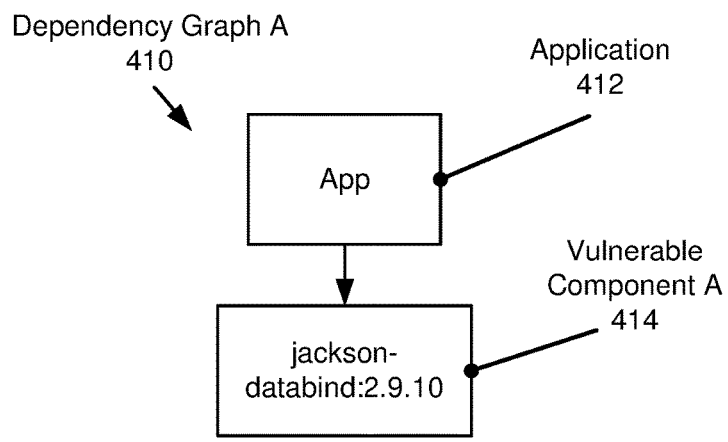

A component C (114C) corresponds to one or more dependency specifications (120C). Each dependency specification represents a direct dependency of the component C (114C) on another component. Turning to FIG. 1B, a dependency specification (150) includes a component Q (114Q), specification attributes (152), and a specification file (154). For example, the component Q (114Q) may be a library used by component C (114C) of FIG. 1A. Component C (114C) of FIG. 1A may be referred to as the calling component, and component Q (114Q) of FIG. 1B may be referred to as the called component. For example, a calling component may call a called component via application programming interfaces (APIs) provided by the called component. The dependency specification (150) may specify a version ID for the component Q (114Q). For example, FIG. 4A shows a dependency specification (402) that specifies a version ID "2.9.10" (406) for a component.

The specification file (154) is a file that stores the dependency specification (150). For example, the specification file (154) may be a Maven project object model (POM) file. The specification file (154) may be stored in the repository (106). The specification attributes (152) describe features of the dependency specification (150). For example, a specification attribute may indicate that the corresponding dependency specification (150) overrides or imports a version ID of a component specified in another dependency specification. Continuing this example, an imported dependency specification may be included in a specification file that includes several related dependency specifications. The imported dependency specification may be a Maven parent POM file or a Maven bill of materials (BOM) file. For example, FIG. 4C shows an "importing" dependency specification (422) that imports a dependency specification (432) shown in FIG. 4D.

Returning to FIG. 1A, the known vulnerable components (122) is a list of components in which vulnerabilities (e.g., security vulnerabilities or obsolescence vulnerabilities) have been detected. For example, the known vulnerable components (122) may include entries of the form <component ID, version ID> indicating that a component labeled with the component ID and version ID is known to be vulnerable.

Figures 4E, 4F:
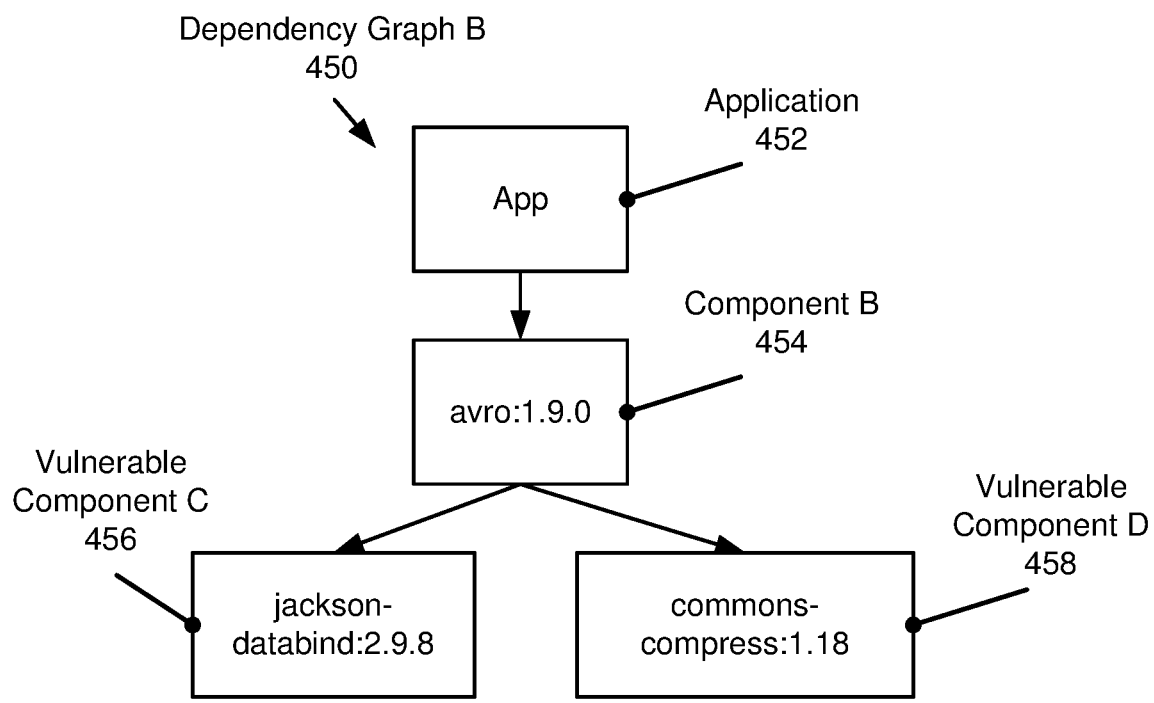

Each dependency graph (124) models a collection of dependency specifications. The dependency graph (124) includes nodes corresponding to components, and directed edges each representing a direct dependency of a calling component on a called component. For example, FIG. 4B shows a dependency graph (410) that includes a direct dependency of an application (412) on a vulnerable component "jackson-databind:2.9.10" (414). In FIG. 4B, the application is the calling component and the vulnerable component is the called component. A path formed by a series of edges in the dependency graph (124) models one or more transitive (i.e., indirect) dependencies between components. For example, FIG. 4F shows a dependency graph (450) that includes a transitive dependency of an application (452) on vulnerable component "jackson-databind:2.9.18" (456) and a transitive dependency of the application (452)

on vulnerable component "commons-compress:1.10" (458). That is, in FIG. 4F, the application (452) sets the version ID of a component (454) that in turn sets the version IDs of the vulnerable components (456, 458).

The upgrade manager (108) includes functionality to recommend, for an application (140), an upgrade solution (130). Returning to FIG. 1B, the upgrade solution (130) includes upgraded version IDs (160J, 160Y) corresponding to dependency specifications (150J, 150Y). The upgrade manager (108) includes functionality to apply the upgrade solution (130) by assigning, in a dependency specification (150J), an upgraded version ID (160J) to a component. For example, the upgrade manager (108) may modify the version ID at line 7 of the dependency specification (402) of FIG. 4A to be an upgraded version ID.

As another example, the upgrade manager (108) may modify the version ID within the import specification shown on lines 12-18 of dependency specification B (422) of FIG. 4C to be an upgraded version ID when the imported dependency specification C (432) shown in FIG. 4D is published externally to dependency specification B (422). That is, when the imported dependency specification C (432) is published externally to the importing dependency specification B (422), the imported dependency specification C (432) may not be modified directly, but may be modified indirectly by modifying the importing dependency specification B (422). In contrast, when the imported dependency specification C (432) of FIG. 4D is published locally with respect to the importing dependency specification B (422) of FIG. 4C, the version ID within the imported dependency specification C (432) may be modified directly, for example, on line 8 of FIG. 4D. For example, the imported dependency specification C (432) of FIG. 4D may be published locally with respect to the importing dependency specification B (422) of FIG. 4C when the application is a multi-module application.

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes an application (140) and dependency specifications (120A) corresponding to the application (140). The application (140) may be thought of as a top-level component (e.g., a project). In one or more embodiments, the application (140) may be a multi-module application that includes multiple modules For example, each module may correspond to a separate POM file, where a top-level POM file for the application (140) specifies the individual module POM files that may declare dependencies with respect to other modules included in the application (140).

The user computing system (102) includes functionality to send the dependency specifications (120A) corresponding to the application (140) to the upgrade manager (108). The back-end computing system (104) further includes functionality to store the dependency specifications (120A) corresponding to the application (140) in the repository (106). The user computing system (102) includes functionality to receive an upgrade solution (130) from the upgrade manager (108). The user computing system (102) includes functionality to upgrade the application (140) using the upgrade solution (130).

In one or more embodiments, the computer processor(s) (110) takes the form of the computer processor(s) (502) described with respect to FIG. 5A and the accompanying description below. In one or more embodiments, the computer processor (110) includes functionality to execute the upgrade manager (108).

While FIG. 1A shows a configuration of components, other configurations may be used without departing from the scope of the invention. For example, various components may be combined to create a single component. As another example, the functionality performed by a single component may be performed by two or more components.

Figure 2:
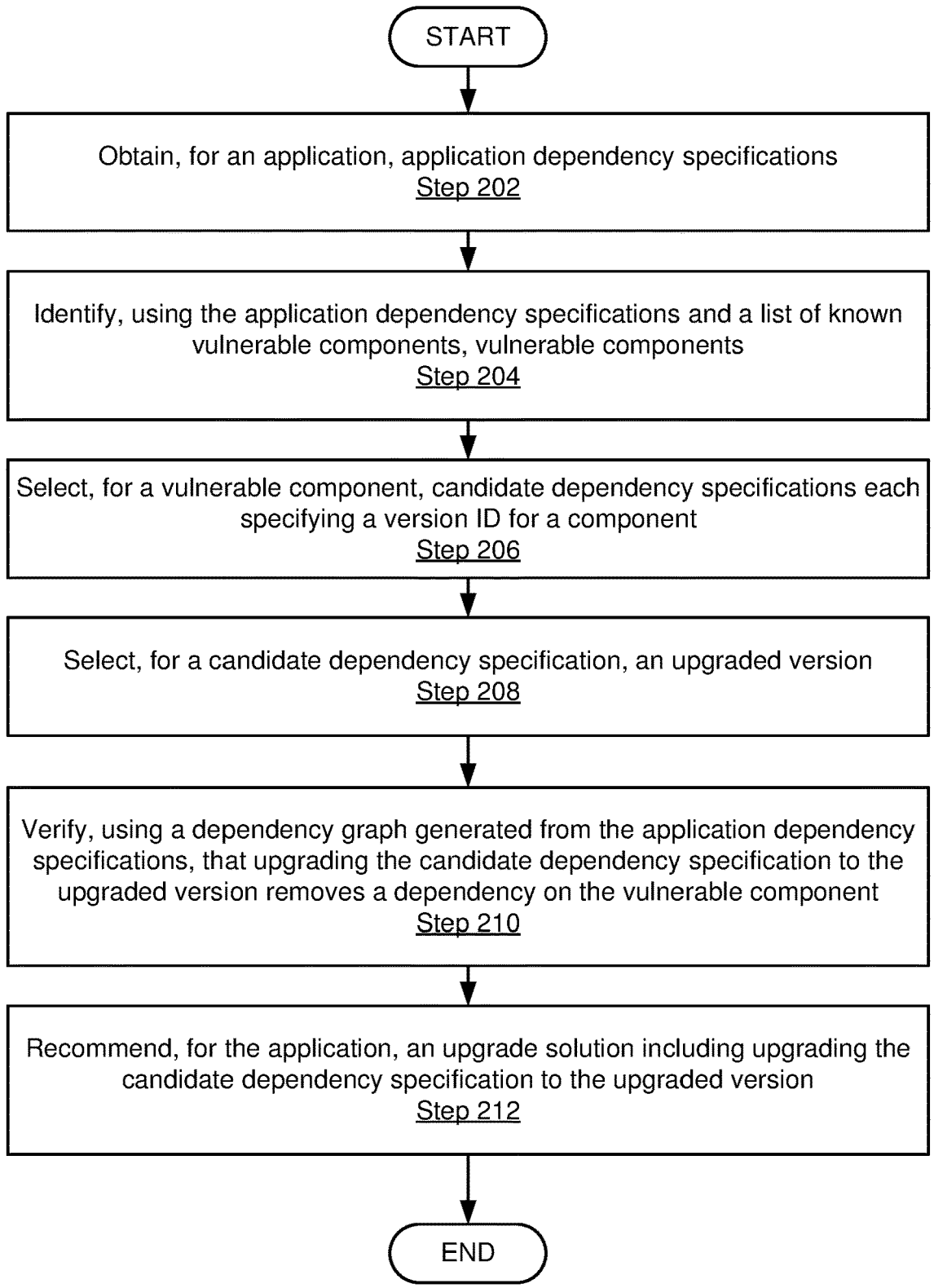
FIG. 2 and FIG. 3 show flowcharts in accordance with one or more embodiments of the invention.

FIG. 2 shows a flowchart in accordance with one or more embodiments of the invention. The flowchart depicts a process for upgrading an application. One or more of the steps in FIG. 2 may be performed by the components (e.g., the upgrade manager (108) of the back-end computing system (104) and/or the user computing system (102), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, application dependency specifications are obtained for an application. The upgrade manager may obtain the application dependency specifications for the application from a dependency specification file stored in the user computing system (e.g., a Maven project object model (POM) file). The upgrade manager may obtain the application dependency specifications in response to an announcement of a vulnerability in a component included in the application dependency specifications. For example, the announcement of the vulnerability may trigger a request to upgrade the application. Alternatively, the upgrade manager may obtain the application dependency specification in response to an announcement that a component included in the application dependency specification has become out-of-date. For example, the component may have become discontinued (e.g., end-of-lifed) or deprecated.

In Step 204, vulnerable components are identified using the application dependency specifications and a list of known vulnerable components. The upgrade manager may identify the vulnerable components by:

1) generating, for the application and from the application dependency specifications, an application dependency graph that represents the direct and transitive dependencies of the application. The nodes of the application dependency graph correspond to the components used by the application and the edges of the application dependency graph each correspond to a direct dependency of a calling component on a called component, and 2) identifying components corresponding to nodes of the dependency graph whose <component ID, version ID> labels are included in the list of known vulnerable components.

The upgrade manager may generate the application dependency graph by performing the following steps:
1) adding nodes corresponding to the components referenced in the application dependency specifications.
2) obtaining, for the components referenced in the application dependency specifications, component dependency specifications. For example, the upgrade manager may obtain the component dependency specifications from a Maven project object model (POM) that indicates, for each component, other components upon which the component directly depends.

3) adding additional nodes corresponding to the additional components (e.g., called components) referenced in the component dependency specifications.

4) adding edges between the components (e.g., calling components) referenced in the application dependency specifications and the components (e.g., called components) specified in the component dependency specifications.

The upgrade manager may then recursively examine the component dependency specifications while adding, to the application dependency graph, nodes corresponding to the components referenced in successive component dependency specifications. The upgrade manager may further add edges between the nodes corresponding to the calling component and the called component of each component dependency specification. In addition, the upgrade manager may further add edges between the nodes corresponding to the called components of a component dependency specification and the nodes corresponding to the calling components of successive component dependency specifications.

In Step 206, candidate dependency specifications are selected for a vulnerable component. The candidate dependency specifications are upgrade targets and may be processed separately. The candidate dependency specifications may each specify a version ID for a component. The upgrade manager may select a candidate dependency specification that sets the version ID of the vulnerable component. For example, the upgrade manager may select, as a candidate dependency specification, dependency specification A (402) in FIG. 4A if the vulnerable component is vulnerable component "jackson-databind:2.9.10" because dependency specification A (402) sets the version ID (406) of vulnerable component "jackson-databind:2.9.10." In FIG. 4A, dependency specification A (402) represents a direct dependency of an application on the component "jackson-databind:2.9.10."

As an alternative example, the upgrade manager may select, as a candidate dependency specification, dependency specification B (422) in FIG. 4C if the vulnerable component is vulnerable component "jackson-databind:2.9.10" because dependency specification B (422) sets the version ID of vulnerable component "jackson-databind:2.9.10." In FIG. 4C, dependency specification B (422) represents a direct dependency of an application on the component "jackson-databind:2.9.10." However, unlike dependency specification A (402) of FIG. 4A, dependency specification B (422) imports another dependency specification, namely dependency specification C (432) of FIG. 4D.

In contrast, the upgrade manager may select, as a candidate dependency specification, a dependency specification that represents a transitive (e.g., indirect) dependency on the vulnerable component. For example, the upgrade manager may select, as a candidate dependency specification, dependency specification D (442) in FIG. 4E if the vulnerable component is vulnerable component "jackson-databind:2.9.8" because dependency specification D (442) sets the version ID of component "avro:1.9.0" (454) that in turn sets the version ID of a vulnerable component "jackson-databind:2.9.8" (456), as shown in the dependency graph (450) of FIG. 4F. Similarly, the upgrade manager may select dependency specification D (442) as a candidate dependency specification if the vulnerable component is component "commons-compress:1.10" because dependency specification D (442) sets the version ID of component "avro:1.9.0" (454) that in turn sets the version ID of a vulnerable component "commons-compress:1.18" (458), as shown in in the dependency graph (450) of FIG. 4F. In FIG. 4E, dependency specification D (442) represents transitive dependencies of an application on the components "jackson-databind:2.9.8" and compress:1.18."

In Step 208, an upgraded version ID for a component is selected for a candidate dependency specification. The upgrade manager may select an upgraded version ID for the candidate dependency specification that removes the dependency of the application on the vulnerable component. The upgrade manager may select the upgraded version ID by performing the following.

1) obtaining a series of version IDs subsequent to a current version ID specified in the candidate dependency specification. For example, the upgrade manager may obtain the series of version IDs using a list of version IDs stored for the component whose version ID is set by the candidate dependency specification. Continuing this example, the list of version IDs may be stored in a Maven index. A second version ID is considered subsequent to a first version ID if the second version ID is higher than the first version ID (e.g., according to an ordering scheme) and the second version ID corresponds to a later published timestamp than the first version ID.

If the candidate dependency specification directly sets the version ID of the vulnerable component, then the upgrade manager may select the first subsequent version ID that is clean (i.e., the first subsequent version ID that is not included in the known vulnerable components list). Thus, the upgrade manager may select, as a "minimal upgrade," a subsequent version ID that is closest to the current version ID and also removes the dependency on the vulnerable component. For example, a version ID that is close to the current version ID may be less likely to result in a potential incompatibility in the application due to upgrading to a version ID that is not backward compatible with another component of the application.

2) Alternatively, if the candidate dependency specification sets the version ID of another component that in turn depends on the vulnerable component, the upgrade manager may generate a series of candidate version dependency graphs corresponding to the series of version IDs for the component specified in the candidate dependency specification. The upgrade manager may generate and process the candidate version dependency graphs according to an ordering scheme for the version IDs based on semantic versioning and/or published timestamps of components. In contrast to the application dependency graph discussed in Step 204 above, which represents the dependencies of the entire application, each candidate version dependency graph represents the dependencies of a different version ID of the component specified in the candidate dependency specification (see description of Step 204 above).

3) determining, using the series of candidate version dependency graphs, whether upgrading the candidate dependency specification to the respective version ID removes the dependency on the vulnerable component. For example, the upgrade manager may determine whether the <component ID, version ID> labels of the components corresponding to the nodes of the respective candidate version dependency graph are included in the list of known vulnerable components. Continuing this example, a dependency on a vulnerable component with component ID C and version ID V may be considered to be removed when the component is upgraded to a version ID W such that the label <component ID C, version ID W> is not included in the list of known vulnerable components.

The upgrade manager may generate and process candidate version dependency graphs until an upgraded version ID is found that removes the dependency on the vulnerable component. If no such version ID is found, then the earliest version ID with the fewest number of dependencies on vulnerable components may be selected.

Figure 4G:
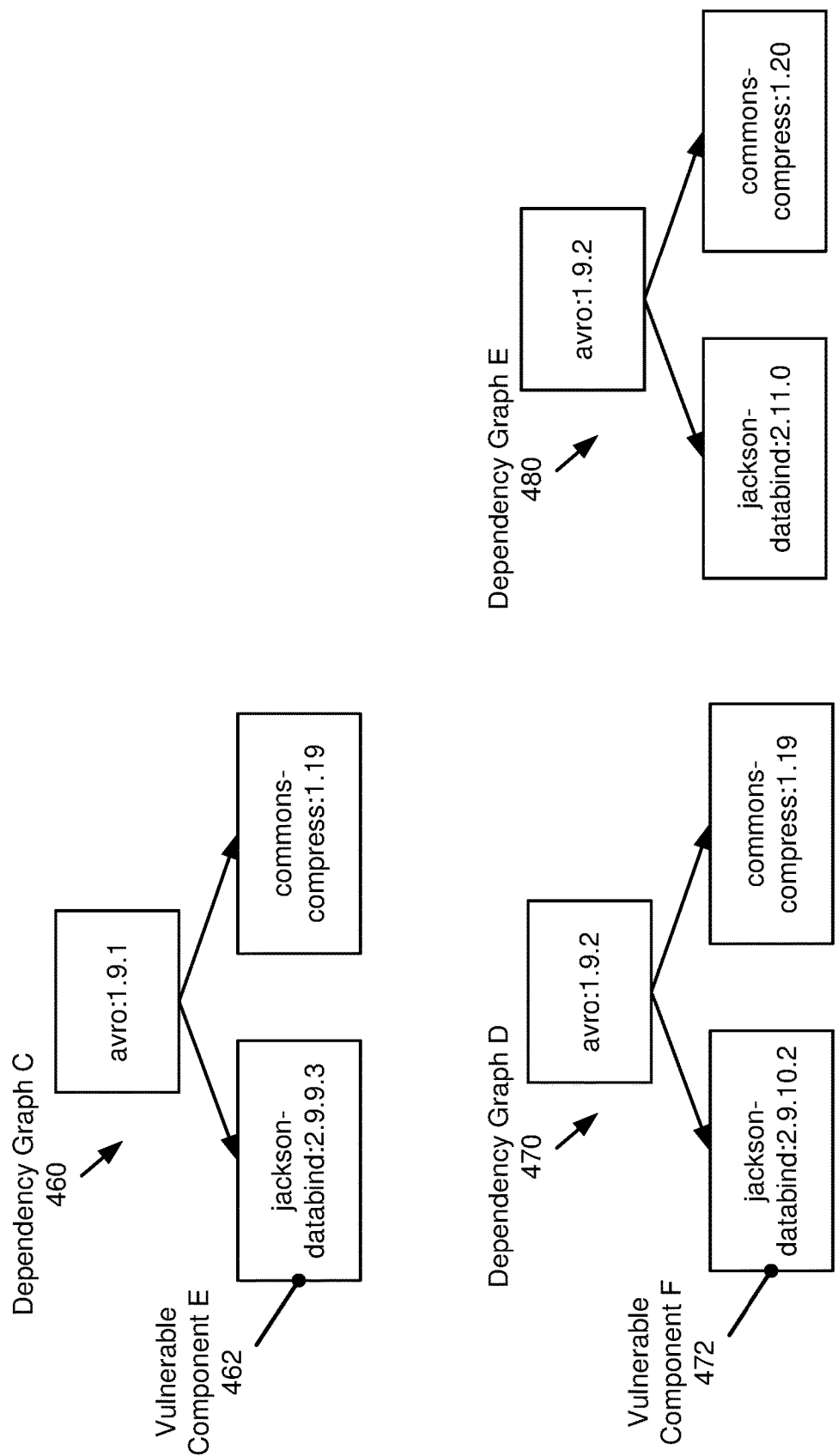

For example, FIG. 4G shows a series of dependency graphs (460, 470, 480) generated for a series of subsequent version IDs of candidate dependency specification D (442) of FIG. 4E. Dependency graph C (460) corresponds to version ID 1.9.1 of the component labeled with component ID "avro," and shows that the version ID of the vulnerable component "commons-compress" is upgraded to a clean (e.g., non-vulnerable) version ID. However, dependency graph C (460) further shows that the version ID of the vulnerable component "jackson-databind," although upgraded, is included in the list of known vulnerable components. Thus, the upgrade manager next generates dependency graph D (470) corresponding to version ID 1.9.2 of the component labeled with component ID "avro," which also shows that the version ID of the vulnerable component "jackson-databind" is included in the list of known vulnerable components. Thus, the upgrade manager next generates dependency graph E (480) corresponding to version ID 1.10.0 of the component labeled with component ID "avro," which finally shows that the version ID of the vulnerable component "jackson-databind" is upgraded to a clean version ID. The upgrade manager then ceases generating and processing candidate version dependency graphs, and selects version ID 1.10.0 as the upgraded version ID for the candidate dependency specification.

If the candidate dependency specification is a parent POM, the upgrade manager may similarly process each version ID in the series of version IDs to process dependencies on vulnerable components. However, instead of generating a candidate version dependency graph for the parent POM, the original application dependency graph (discussed in Step 204 above) may be regenerated using the upgraded parent POM because a candidate version dependency graph for the parent POM may fail to detect dependencies resulting from declarations in a child POM corresponding to a parent POM.

In Step 210, upgrading the candidate dependency specification to the upgraded version ID is verified, using the application dependency graph generated from the application dependency specifications, to remove a dependency on the vulnerable component. Once the upgraded version ID has been processed using a candidate version dependency graph for the component specified in the candidate dependency specification, the upgrade manager then performs a similar, global analysis by re-generating the application dependency graph (discussed in Step 204 above) using the upgraded version ID for the candidate dependency specification. For example, the upgrade manager may verify, using the re-generated application dependency graph, that upgrading the candidate dependency specification to the upgraded version ID removes the dependency on the vulnerable component. In addition, the upgrade manager may check whether any additional dependencies on vulnerable components have been introduced due to the upgrade. For example, a subsequent version of a component may introduce new dependencies on vulnerable components. If new dependencies on vulnerable components were added, Step 206 and/or Step 208 above may be repeated in an attempt to remove the new dependencies on vulnerable components. For example, when repeating Step 208, a second subsequent upgraded version ID for the candidate dependency specification may be selected in an attempt to remove a new dependency on a vulnerable component, where the second subsequent upgraded version ID follows, in an ordering scheme for version IDs, the upgraded version ID selected in the previous iteration of Step 208.

As an alternative example, when repeating Step 206, a second set of candidate dependency specifications may be selected in an attempt to remove a new dependency on a vulnerable component. Then, when repeating Step 208, the upgrade manager may select, for a candidate dependency specification selected from the second set of candidate dependency specifications, an upgraded version ID for a component that is different from the component referenced in the previous iteration of Step 208.

If the upgrade manager is unable to remove one or more dependencies on vulnerable components, the upgrade manager may:
1) issue an alert indicating that the application includes one or more dependencies on vulnerable components. The alert may include the candidate dependency specification and the component ID and version ID of each vulnerable component, and/or
2) recommend an upgrade solution in Step 212 below that removes as many of the dependencies on vulnerable components as possible.

In Step 212, an upgrade solution including upgrading the candidate dependency specification to the upgraded version ID is recommended for the application. The upgrade solution may further include upgrading one or more additional candidate dependency specifications to upgraded version IDs that were generated during one or more iterations of Step 206, Step 208, and Step 210 above. The upgrade solution may be stored in an output file (e.g., a patch file) that includes the upgraded version ID corresponding to each candidate dependency specification processed during one or more iterations of Step 206, Step 208, and Step 210 above. The output file may be used to assign, in a specification file corresponding to each candidate dependency specification of the upgrade solution, the upgraded version ID to the respective candidate dependency specification.

The upgrade solution may be presented to a user (e.g., a software developer or information technology administrator) for review. For example, the upgrade solution may be presented to the user via a graphical user interface (GUI) of the user computing system, where the user may approve or reject the upgrade solution.

The process of FIG. 2 may be extended to support multi-module applications as follows. Generating the application dependency graph for multi-module applications may include separately generating module dependency graphs for each module, such that identifying the modules to be generated includes scanning a list of modules included in a top-level file (e.g., a top-level POM file) for the application. Each file (e.g., POM file) referenced in the list of modules may declare its own submodules, which may be scanned recursively. Once the module dependency graphs are generated, the modules may be separately processed to produce a combined set of candidate dependency specifications for the multi-module application. Then an upgraded version ID may be selected for each candidate dependency specification as described above. One modification to the process of FIG. 2 is that the module updated dependency graphs are processed when upgrading a parent POM. When verifying in Step 210 above, the process may be performed over the set of modules in the multi-module application.

Figure 3:
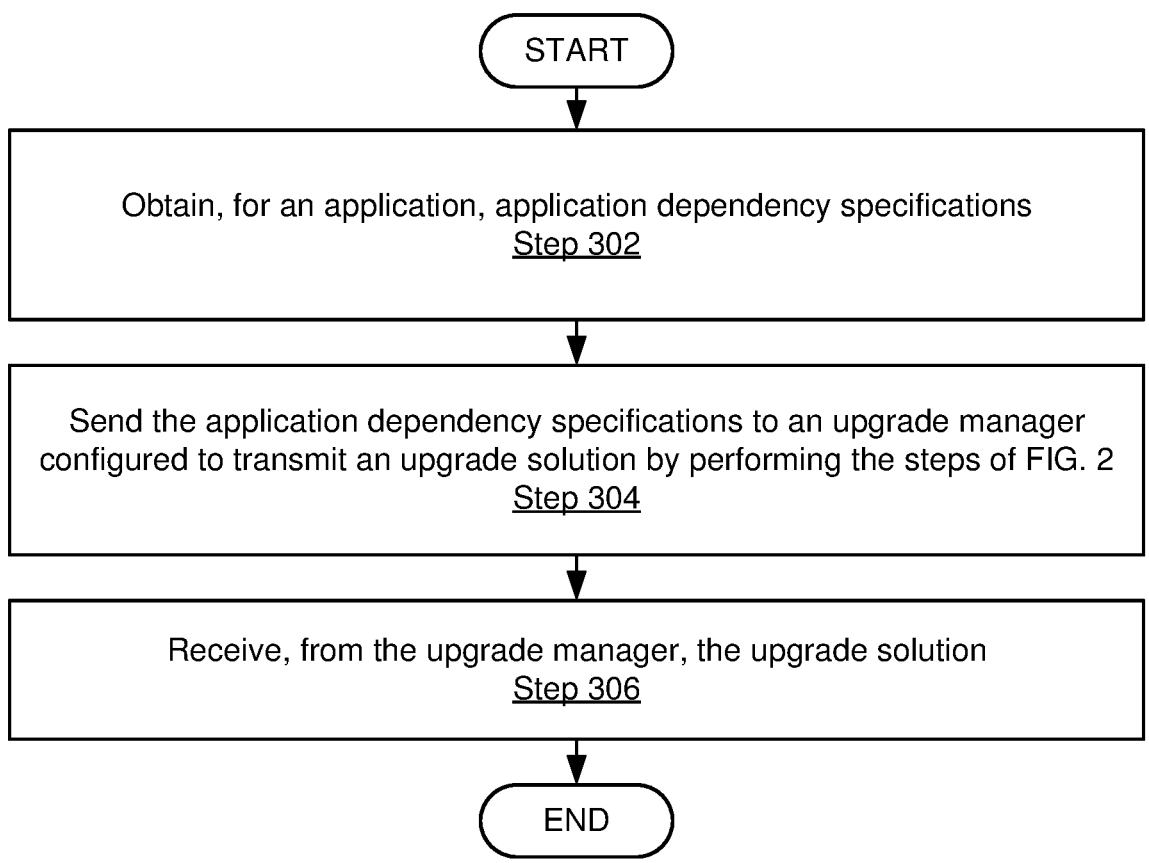

FIG. 3 shows a flowchart in accordance with one or more embodiments of the invention. The flowchart depicts a process for upgrading an application. One or more of the steps in FIG. 3 may be performed by the components (e.g., the upgrade manager (108) of the back-end computing system (104) and/or the user computing system (102), discussed above in reference to FIG. 1A). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, application dependency specifications are obtained for an application (see description of Step 202 above).

In Step 304, the application dependency specifications are sent to an upgrade manager configured to transmit an upgrade solution by performing the steps of FIG. 2. The application dependency may be sent to the upgrade manager via a network.

In Step 306, the upgrade solution is received from the upgrade manager. The upgrade solution may be received from the upgrade manager via the network.

FIG. 4A, FIG. 4B, FIG. 4C, FIG. 4D, FIG. 4E, FIG. 4F, and FIG. 4G show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

As previously discussed, FIG. 4A shows a dependency specification (402) ((120A, 120C, 120R) in FIG. 1A and (150, 150J, 150Y) in FIG. 1B) that represents a direct dependency of an application on the component "jackson-databind:2.9.10." The component "jackson-databind: 2.9.10" has a component ID "jackson-databind" (404) ((116) in FIG. 1A) and a version ID "2.9.10" (406) ((118) in FIG. 1A). FIG. 4B shows a dependency graph (410) ((124) in FIG. 1A) that represents the direct dependency of the application (412) ((140) in FIG. 1A) on the component "jackson-databind: 2.9.10" (414) ((114C, 114R) in FIG. 1A and (114Q) in FIG. 1B).

As previously discussed, FIG. 4C shows dependency specification B (422) that represents a direct dependency of an application on the component "jackson-databind:2.9.10." Dependency specification B (422) imports dependency specification C (432) shown in FIG. 4D.

As previously discussed, FIG. 4E shows dependency specification D (442) that represents transitive (e.g., indirect) dependencies of an application on the components "jackson-databind:2.9.8" and "commons-compress:1.18," as shown in the dependency graph (450) of FIG. 4F. The dependency graph (450) shows that the application (452) has transitive dependencies on component "jackson-databind: 2.9.8" (456) and component "commons-compress:1.18" (458). That is, the transitive dependency of the application (452) on the component "jackson-databind:2.9.8" (456) includes a direct dependency of the application (452) on the component "avro:1.9.0" (454) and a direct dependency of the component "avro:1.9.0" (454) on the component "jackson-databind:2.9.8" (456). For example, dependency specification D (442) sets the version ID of the component "avro:1.9.0" (454) that in turn sets the version ID of component "jackson-databind:2.9.8" (456). Similarly, the transitive dependency of the application (452) on the component "commons-compress:1.18" (458) includes a direct dependency of the application (452) on the component "avro: 1.9.0" (454) and a direct dependency of the component "avro:1.9.0" (454) on the component "commons-compress: 1.18" (458).

As previously discussed, FIG. 4G shows a series of dependency graphs (460, 470, 480) generated for a series of subsequent version IDs of dependency specification (442) of FIG. 4E. FIG. 4E shows that dependency specification (442) specifies the version ID "1.9.0" for the component labeled with component ID "avro." Dependency graph C (460) corresponds to a subsequent version ID "1.9.1" and shows that the version ID of the vulnerable component "commons-compress" is upgraded to a clean (e.g., non-vulnerable) version ID. However, dependency graph C (460) also shows that the version ID of the vulnerable component "jackson-databind," although upgraded, is included in the list of known vulnerable components. Dependency graph D (470) corresponding to version ID 1.9.2 of the component labeled with component ID "avro" also shows that the version ID of the vulnerable component "jackson-databind" is included in the list of known vulnerable components. Dependency graph E (480) corresponding to version ID 1.10.0 of the component labeled with component ID "avro," shows that the version ID of the vulnerable component "jackson-databind" is upgraded to a clean version ID.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
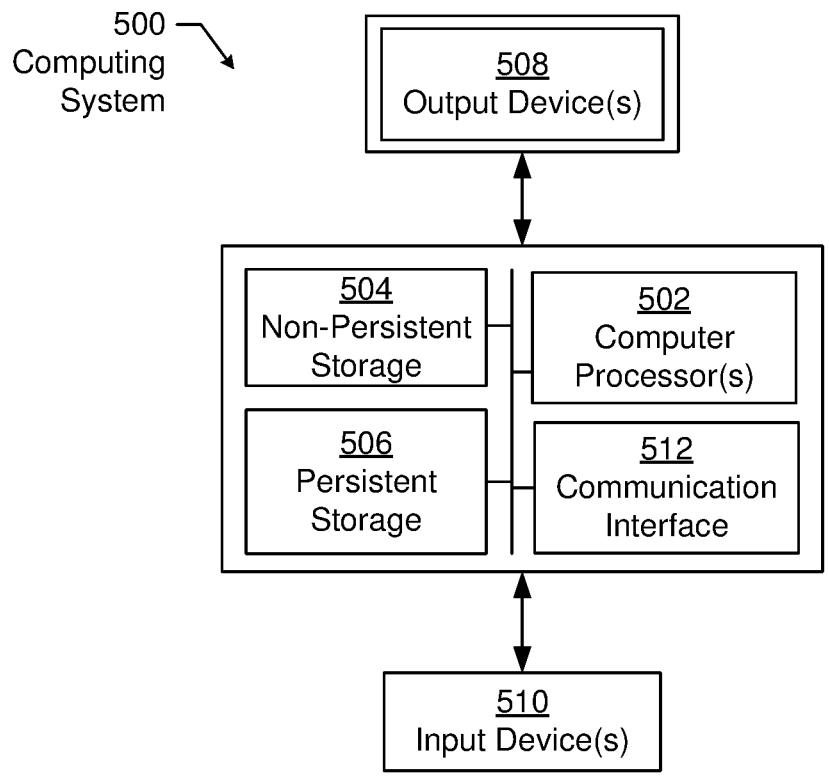
FIG. 5A and FIG. 5B show computing systems in accordance with one or more embodiments of the invention.
Figure 5B:
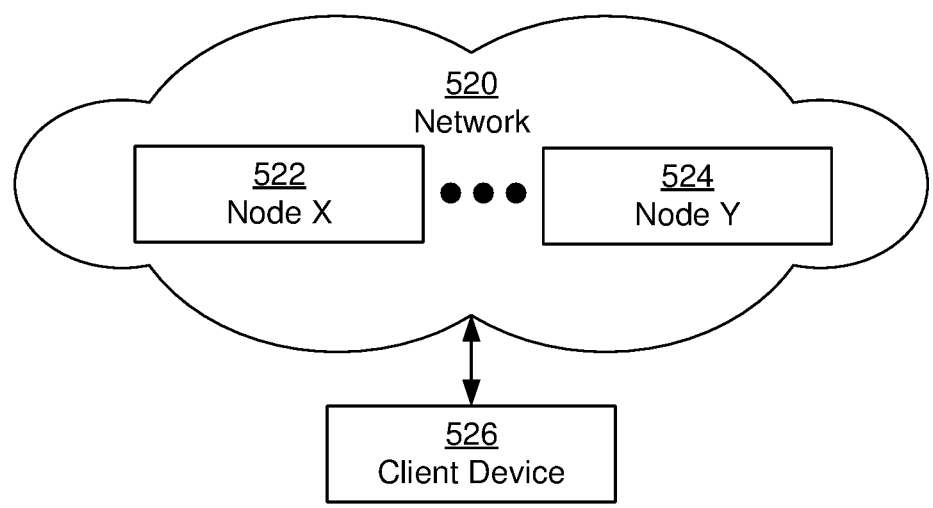

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   obtaining, for an application, a plurality of application dependency specifications;
   identifying, using the plurality of application dependency specifications and a list of known vulnerable components, a plurality of vulnerable components;
   selecting, for a first vulnerable component of the plurality of vulnerable components, a first plurality of candidate dependency specifications each specifying a version ID for a component;
   selecting, for a first candidate dependency specification of the first plurality of candidate dependency specifications, a first upgraded version ID for a first component;
   verifying, using an application dependency graph generated from the plurality of application dependency specifications, that upgrading the first candidate dependency specification to the first upgraded version ID removes a first dependency on the first vulnerable component; and
   recommending, for the application, an upgrade solution comprising upgrading the first candidate dependency specification to the first upgraded version ID.

2. The method of claim 1, wherein selecting the first upgraded version ID for the first candidate dependency specification comprises:
   obtaining a series of version IDs subsequent to a current version ID specified in the first candidate dependency specification;
   generating a series of candidate version dependency graphs corresponding to the series of version IDs; and
   determining, using the series of candidate version dependency graphs, that upgrading the first candidate dependency specification to a first subsequent version ID of the series of version IDs removes the first dependency on the first vulnerable component.

3. The method of claim 2, further comprising:
   determining, using the application dependency graph, that upgrading the first candidate dependency specification to the first subsequent version ID introduces a second dependency on a second vulnerable component of the plurality of vulnerable components; and
   determining, using the series of candidate version dependency graphs, that upgrading the first candidate dependency specification to a second subsequent version ID of the series of version IDs removes the second dependency on the second vulnerable component.

4. The method of claim 1, further comprising:
   selecting, for a second vulnerable component of the plurality of vulnerable components, a second plurality of candidate dependency specifications;
   selecting a second upgraded version ID of a second candidate dependency specification of the second plurality of candidate dependency specifications; and
   verifying, using the application dependency graph, that upgrading the second candidate dependency specification to the second upgraded version ID removes a second dependency on the second vulnerable component.

5. The method of claim 1, further comprising:
   determining, using the application dependency graph, that upgrading the first candidate dependency specification to the first upgraded version ID introduces a second dependency on a second vulnerable component of the plurality of vulnerable components;
   selecting, for the second vulnerable component, a second plurality of candidate dependency specifications;
   selecting a second upgraded version ID of a second candidate dependency specification of the second plurality of candidate dependency specifications; and
   verifying, using the application dependency graph, that upgrading the second candidate dependency specification to the second upgraded version ID removes the second dependency on the second vulnerable component.

6. The method of claim 5, wherein the upgrade solution further comprises upgrading the second candidate dependency specification to the second upgraded version ID, the method further comprising:
   generating an output file comprising the first upgraded version ID for the first candidate dependency specification and the second upgraded version ID for the second candidate dependency specification.

7. The method of claim 1, further comprising:
   determining, using the application dependency graph, that upgrading the first candidate dependency specification to the first upgraded version ID introduces a second dependency on a second vulnerable component of the plurality of vulnerable components;
   selecting, for the second vulnerable component, a second plurality of candidate dependency specifications;
   failing, using the application dependency graph, to identify a candidate dependency specification in the second plurality of candidate dependency specifications that removes the second dependency on the second vulnerable component; and
   issuing an alert indicating that the application comprises a dependency on the second vulnerable component.

8. A system comprising:
   a repository configured to store:
      a plurality of application dependency specifications, and
      a list of known vulnerable components;
   a computer processor; and
   an upgrade manager executing on the computer processor and configured to:
      obtain, for an application, the plurality of application dependency specifications,
      identify, using the plurality of application dependency specifications and the list of known vulnerable components, a plurality of vulnerable components, select, for a first vulnerable component of the plurality of vulnerable components, a first plurality of candidate dependency specifications each specifying a version ID for a component, select, for a first candidate dependency specification of the first plurality of candidate dependency specifications, a first upgraded version ID for a first component, verify, using an application dependency graph generated from the plurality of application dependency specifications, that upgrading the first candidate dependency specification to the first upgraded version ID removes a first dependency on the first vulnerable component, and recommend, for the application, an upgrade solution comprising upgrading the first candidate dependency specification to the first upgraded version ID.

9. The system of claim 8, wherein the upgrade manager is further configured to select the first upgraded version ID for the first candidate dependency specification by:

obtaining a series of version IDs subsequent to a current version ID specified in the first candidate dependency specification, generating a series of candidate version dependency graphs corresponding to the series of version IDs, and determining, using the series of candidate version dependency graphs, that upgrading the first candidate dependency specification to a first subsequent version ID of the series of version IDs removes the first dependency on the first vulnerable component.

10. The system of claim 9, wherein the upgrade manager is further configured to:

determine, using the application dependency graph, that upgrading the first candidate dependency specification to the first subsequent version ID introduces a second dependency on a second vulnerable component of the plurality of vulnerable components, and determine, using the series of candidate version dependency graphs, that upgrading the first candidate dependency specification to a second subsequent version ID of the series of version IDs removes the second dependency on the second vulnerable component.

11. The system of claim 8, wherein the upgrade manager is further configured to:

select, for a second vulnerable component of the plurality of vulnerable components, a second plurality of candidate dependency specifications, select a second upgraded version ID of a second candidate dependency specification of the second plurality of candidate dependency specifications, and verify, using the application dependency graph, that upgrading the second candidate dependency specification to the second upgraded version ID removes a second dependency on the second vulnerable component.

12. The system of claim 8, wherein the upgrade manager is further configured to:

determine, using the application dependency graph, that upgrading the first candidate dependency specification to the first upgraded version ID introduces a second dependency on a second vulnerable component of the plurality of vulnerable components, select, for the second vulnerable component, a second plurality of candidate dependency specifications, select a second upgraded version ID of a second candidate dependency specification of the second plurality of candidate dependency specifications, and verify, using the application dependency graph, that upgrading the second candidate dependency specification to the second upgraded version ID removes the second dependency on the second vulnerable component.

13. The system of claim 12, wherein the upgrade solution further comprises upgrading the second candidate dependency specification to the second upgraded version ID, and wherein the upgrade manager is further configured to:

generate an output file comprising the first upgraded version ID for the first candidate dependency specification and the second upgraded version ID for the second candidate dependency specification.

14. The system of claim 8, wherein the upgrade manager is further configured to:

determine, using the application dependency graph, that upgrading the first candidate dependency specification to the first upgraded version ID introduces a second dependency on a second vulnerable component of the plurality of vulnerable components, select, for the second vulnerable component, a second plurality of candidate dependency specifications, fail, using the application dependency graph, to identify a candidate dependency specification in the second plurality of candidate dependency specifications that removes the second dependency on the second vulnerable component, and issue an alert indicating that the application comprises a dependency on the second vulnerable component.

15. A method, comprising:

obtaining, for an application, a plurality of application dependency specifications;

sending the plurality of application dependency specifications to an upgrade manager configured to perform:

identifying, using the plurality of application dependency specifications and a list of known vulnerable components, a plurality of vulnerable components, selecting, for a first vulnerable component of the plurality of vulnerable components, a first plurality of candidate dependency specifications each specifying a version ID for a component, selecting, for a first candidate dependency specification of the first plurality of candidate dependency specifications, a first upgraded version ID for a first component, verifying, using an application dependency graph generated from the plurality of application dependency specifications, that upgrading the first candidate dependency specification to the first upgraded version ID removes a first dependency on the first vulnerable component, recommending, for the application, an upgrade solution comprising upgrading the first candidate dependency specification to the first upgraded version ID, and transmitting the upgrade solution; and receiving, from the upgrade manager, the upgrade solution.

16. The method of claim 15, wherein selecting the first upgraded version ID for the first candidate dependency specification comprises:

obtaining a series of version IDs subsequent to a current version ID specified in the first candidate dependency specification;

generating a series of candidate version dependency graphs corresponding to the series of version IDs; and determining, using the series of candidate version dependency graphs, that upgrading the first candidate dependency specification to a first subsequent version ID of the series of version IDs removes the first dependency on the first vulnerable component.

17. The method of claim 16, wherein the upgrade manager is further configured to perform:
   determining, using the application dependency graph, that upgrading the first candidate dependency specification to the first subsequent version ID introduces a second dependency on a second vulnerable component of the plurality of vulnerable components; and
   determining, using the series of candidate version dependency graphs, that upgrading the first candidate dependency specification to a second subsequent version ID of the series of version IDs removes the second dependency on the second vulnerable component.

18. The method of claim 15, wherein the upgrade manager is further configured to perform:
   selecting, for a second vulnerable component of the plurality of vulnerable components, a second plurality of candidate dependency specifications;
   selecting a second upgraded version ID of a second candidate dependency specification of the second plurality of candidate dependency specifications; and
   verifying, using the application dependency graph, that upgrading the second candidate dependency specification to the second upgraded version ID removes a second dependency on the second vulnerable component.

19. The method of claim 15, wherein the upgrade manager is further configured to perform:
   determining, using the application dependency graph, that upgrading the first candidate dependency specification to the first upgraded version ID introduces a second dependency on a second vulnerable component of the plurality of vulnerable components;
   selecting, for the second vulnerable component, a second plurality of candidate dependency specifications;
   selecting a second upgraded version ID of a second candidate dependency specification of the second plurality of candidate dependency specifications; and
   verifying, using the application dependency graph, that upgrading the second candidate dependency specification to the second upgraded version ID removes the second dependency on the second vulnerable component.

20. The method of claim 19, wherein the upgrade solution further comprises upgrading the second candidate dependency specification to the second upgraded version ID, and wherein the upgrade manager is further configured to perform:
   generating an output file comprising the first upgraded version ID for the first candidate dependency specification and the second upgraded version ID for the second candidate dependency specification.

* * * * *